A. H. YOUNG.
DIRECTION SIGNAL FOR VEHICLES.
APPLICATION FILED DEC. 14, 1918.
1,318,822.
Patented Oct. 14, 1919.
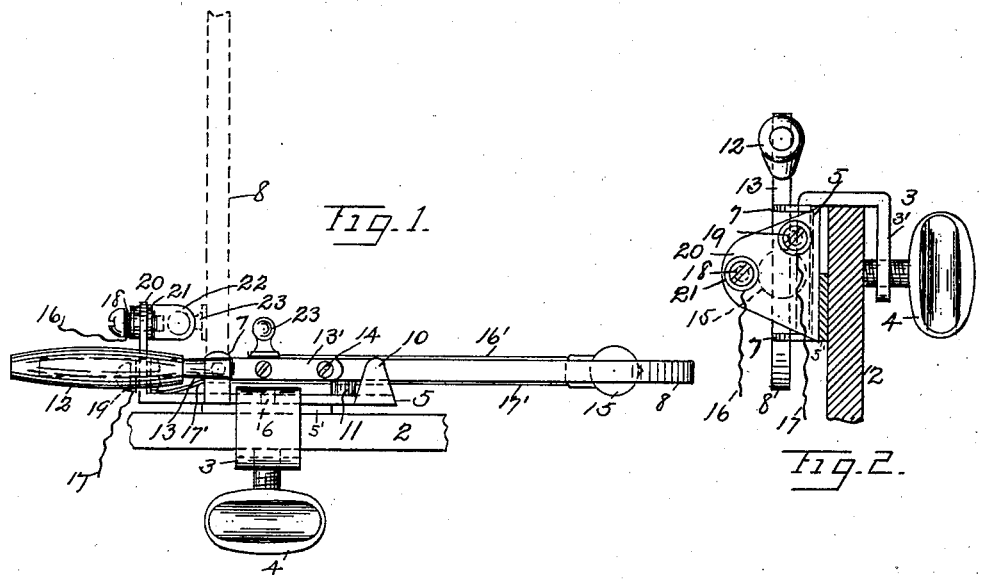
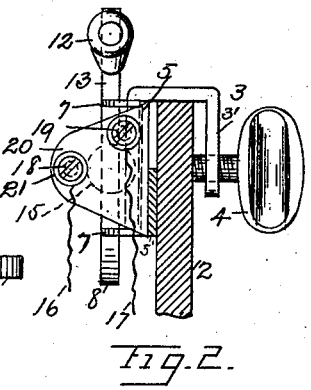
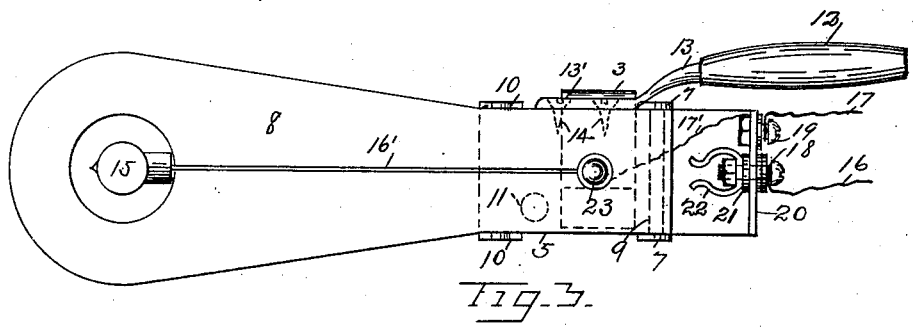
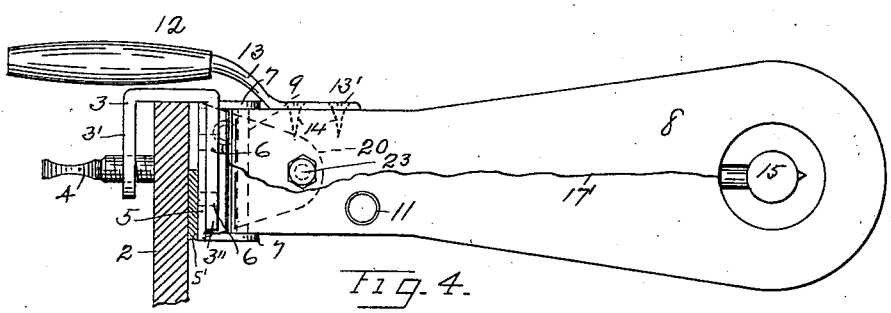
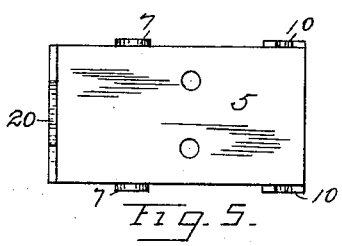
INVENTOR.
Albert H. Young.
BY
ATTORNEY.

UNITED STATES PATENT OFFICE.

ALBERT H. YOUNG, OF SYRACUSE, NEW YORK, ASSIGNOR OF TWO-THIRDS TO CHARLES L. PETTIS AND EUGENE W. LOGAN, BOTH OF SYRACUSE, NEW YORK.

DIRECTION-SIGNAL FOR VEHICLES.

1,318,822.      Specification of Letters Patent.      Patented Oct. 14, 1919.

Application filed December 14, 1918. Serial No. 266,682.

*To all whom it may concern:*

Be it known that I, ALBERT H. YOUNG, a citizen of the United States, residing at Syracuse, in the county of Onondaga and State of New York, have invented certain new and useful Improvements in Direction-Signals for Vehicles, of which the following is a specification.

This invention relates to improvements in direction signals for automobiles and other vehicles, and has for its object to provide a novel, simple and effective device of the class, comprising a target, which may be swung and extended beyond the body of the car, for indicating various turning movements, as either to the right or to the left. A particular object is to provide a direction indicator which may be detachably applied to any convenient part of a vehicle, and may be operated by the driver or by the passengers, and when not needed for signaling, the device may be readily and quickly detached and laid away, and then reapplied in a moment's time when its use is again desired or required. And a further object is to provide means for illuminating the target, so as to render the same visible in the night time.

I attain these objects by the means set forth in the detailed description which follows, and as illustrated by the accompanying drawing, in which—

Figure 1 is a top-plan view of the complete device; showing the same applied ready for use; also showing the target in the operated and unoperated positions.

Fig. 2 is a rear-end view of the same.

Fig. 3 is an enlarged side elevation; showing the target in the closed position.

Fig. 4 is a similar view; showing the target in the open or operated position.

Fig. 5 is a top-face view of the bracket which supports the target and other parts.

In the drawing, 2 represents a portion of the tonneau or body of a vehicle. 3 is a U-shaped clamping member, which is arranged to straddle the part 2 and is held in attachment with said part by a thumb-screw 4, which is threaded through the shorter arm 3′ of the clamp. 5 is a bracket-plate, preferably made of sheet-metal, which is rigidly secured to the longer arm 3″ of the clamp by rivets 6, which hold the said bracket parallel to the said arms. In order to prevent the bracket from bruising or marring the finish of the vehicle, as well as to compensate for any unevenness of the body, I provide a strip of non-abrasive material, 5′, which is secured to the outer face of the bracket. The bracket 5 is provided with a pair of lugs 7, which are bent at right angles to the bracket and are also perforated. 8 is the target, the narrow end of which is pivoted between the lugs 7, by means of a pin 9, in such manner that the target may be freely swung to the extent of 90° or more, as from the full to the dotted line position shown in Fig. 1. When the target is in the closed position shown in full lines in Figs. 1, 2 and 3, the blade of the target is received between two guide lugs 10, which are integral with and are positioned near the forward end of the bracket 5. The lugs 10 preferably have enough spring tension to grip and hold the target from accidental release while in the closed position. A rubber or other suitable buffer 11, carried by the target, holds the said part a suitable distance from the bracket. The target 8 is operated by a handle 12, which is mounted on a metal tang 13, the latter having a flattened portion 13′, which engages and is rigidly secured to the top edge of the blade by screws 14. The handle 12 is preferably disposed in line with the target and extends rearwardly beyond its pivoted end sufficiently to allow free manipulation without interference by the other parts of the device.

15 represents an electric light bulb, which is preferably disposed in a circular opening in the broad end of the blade 8. This light is provided with current from any suitable source, as from the lighting system carried by the vehicle, by wires 16 and 17, which connect respectively with binding-posts 18 and 19, the said posts being supported by a relatively large lug 20, which extends across the rear end of the bracket 5; and also by wires 16′ and 17′, which are preferably disposed on the opposite sides of the target blade and connect at one end with the lamp 15. The binding-post 18 is preferably insulated from the lug 20 by a bushing 21, and the said post also supports a double-spring switch member 22, which is arranged to receive the ball-end of another switch member 23 carried by the target, and to which the wire 16' is connected. To complete the signal-light circuit, the wire 17' extends from the lamp 15 to and connects with the binding-post 19. The switch 22—23, in addition to providing for the making and breaking of the signal circuit, also serves to hold the target steady and prevents vibration and accidental releasing thereof while the target is extended to the operated position, as shown by dotted lines in Fig. 1.

My direction indicator is extremely simple in construction and operation and can be produced at a small cost. By the employment of the clamp 3, the indicator may be readily and quickly attached to any convenient part of the vehicle, such as the top edges of the doors or similar portions of the body of the vehicle, and its attachment and removal can be accomplished without marring or disfiguring the vehicle, and without requiring any extra attaching parts. The device may be readily mounted on either side of the vehicle within easy reach of the driver or other occupant of the front seat, or it may be disposed adjacent the rear seat and be operated by the occupants of that seat.

Having thus described my invention, what I claim as new and desire to secure by Letters Patent, is—

1. In a direction indicator for vehicles, a bracket having a pair of perforated lugs and a pair of spring guide lugs, a clamping member secured to the bracket between the perforated and guide lugs, a target pivoted to the perforated lugs and held in closed position parallel to the bracket by the spring guide lugs, adapted to swing away from the bracket for indicating turning movements of the vehicle, and a spring-switch adapted to hold the target at right angles to the bracket.

2. In a direction indicator for vehicles, the combination with a bracket having a pair of perforated lugs, a pair of guide lugs in line with said perforated lugs and an end lug, of a target pivoted between the perforated lugs adapted to be resiliently held in the closed position parallel to the body of the vehicle by the tension of the guide lugs, an electric switch comprising a member carried by the end lug and a member mounted on the side of the target adapted to hold the target at right angles to the side of the vehicle.

In testimony whereof I affix my signature.

ALBERT H. YOUNG.

Copies of this patent may be obtained for five cents each, by addressing the "Commissioner of Patents, Washington, D. C."